3,769,213
OVERBASED CALCIUM SULFONATE-LUBRICATING OIL COMPOSITIONS
Norman C. Ross, Allison Park, Pa., Hans Schindler, New York, N.Y., and Joseph H. Waples, New Orleans, La., assignors to Witco Chemical Corporation, New York, N.Y.
No Drawing. Filed Dec. 8, 1969, Ser. No. 883,357
Int. Cl. C10m 1/40
U.S. Cl. 252—33.4                       7 Claims

ABSTRACT OF THE DISCLOSURE

An overbasing process to produce calcium compound dispersions in lubricating oil having a base number of at least about 250 which comprises:
(a) admixing calcium sulfonate, water, isobutanol, and lubricating oil;
(b) add carbonated complex of calcium methoxide in isobutanol;
(c) hydrolyze;
(d) heat to remove most water and isobutanol;
(e) cool;
(f) mix overbased product of step (e) with water and isobutanol;
(g) repeat step (b);
(h) repeat step (c);
(i) repeat step (d);
(j) repeat step (e), and
(k) filter.

---

This invention relates to stable, highly basic dispersions of calcium compounds in liquid lubricating oils, and, more particularly, to the production of stable, overbased calcium sulfonate-lubricating oil concentrates having a very high base number and low viscosity.

Calcium or other alkaline earth metal petroleum sulfonates and overbased petroleum sulfonates have become widely used as lubricating oil additives. Overbased sulfonates, due to their higher alkaline reserve, are capable of neutralizing larger quantities of acidic decomposition products which accumulate in lubricating oil, as well as exhibiting excellent detergent properties and are, therefore, useful for preventing sludge formation in heavy duty oils such as are used in diesel and similar internal combustion engines.

The term "overbased calcium sulfonate," as employed herein, is meant to describe a highly basic composition containing calcium compounds which are stably colloidaly dispersed or suspended in lubricating oils in amounts in excess of that sufficient to form neutral calcium sulfonate. In these compositions, there is present neutral calcium sulfonate and excess calcium in the forms of calcium compounds which interact so as to maintain the excess calcium in a dispersed colloidal state. Overbased calcium sulfonates are denoted when the ratio of number of equivalents of calcium metal to equivalents of sulfonic acid is greater than 1. The term base number (ASTM-D-664) is commonly employed to describe the degree of alkalinity of these products and is defined as the number of milligrams of potassium hydroxide equivalent to the amount of acid required to neutralize the alkaline constituents present in one gram of sample.

Various procedures for preparing highly basic compositions have been reported and are disclosed, for example, in U.S. Pats. 2,585,520; 2,861,951; 2,895,913; 2,920,105; 2,956,018; 2,982,726; 3,083,161; 3,085,064; 3,150,088; 3,152,991; 3,223,630; 3,250,710; 3,365,396; 3,384,585 and 3,384,587. It is well known in the art that difficulties have been encountered in preparing compositions having very high base numbers, i.e. in the order of 300 and upwards, and especially in the order of 350 to 450 and even higher that exhibit a particularly suitable viscosity, i.e. less than about 1000 S.U.S. at 210° F. Particular difficulty has been encountered in controlling the particle size of the dispersed colloidal calcium compounds so as to provide a stable, yet highly alkaline, composition which could be blended with commercial lubricating oils.

In accordance with the present invention, it has been discovered that stable, highly basic lubricating oil concentrates can be prepared with base numbers in the range of 250 and upwards, and particularly in the range of 350 to 450 and even higher, by a multi-step process which comprises, providing an admixture of calcium sulfonate dispersing agent, lubricating oil, water and isobutanol, adding thereto a carbonated complex of calcium methoxide in isobutanol, allowing hydrolysis to occur, removing substantially all the water and isobutanol therefrom, then admixing the overbased concentrate so prepared with water and isobutanol, adding an additional amount of carbonated complex of calcium methoxide in isobutanol to said mixture, allowing hydrolysis to occur and then removing substantially all the water and isobutanol therefrom. The resulting product can then be filtered so as to produce a clear, stable, overbased concentrate having a viscosity appreciably less than about 1000 S.U.S.

The process of the present invention offers a number of highly significant advantages. Surprisingly, by adding the carbonated calcium methoxide complex according to the process of the present invention, highly alkaline stable products are produced which have base numbers greater than are obtained if the same quantity of calcium complex were combined with the lubricating oil solution in one additive step. Furthermore, in practicing the process of the present invention, no additional calcium sulfonate dispersing agent is required; yet, the final overbased product, speaking particularly of those having base numbers in excess of 350, has a significantly lower viscosity than similar products prepared heretofore by one-step overbasing procedures. Most importantly, overbased lubricating oil compositions having a base number in excess of 375 and also in excess of 400 are readily produced.

Further, it has been discovered that stable, overbased calcium sulfonate-lubricating oil concentrates having a base number of at least about 150, and prepared by various previously known procedures, can be treated in accordance with the practice of the present invention to prepare stable overbased concentrates having base numbers of at least about 250, and especially at least about 350 or at least about 375, and viscosities appreciably less than about 1000 S.U.S. Generally, the overbased concentrate to be upgraded in basicity in accordance with the practice of the preesnt invention can be prepared by a variety of known techniques for manufacturing stable, overbased lubricating oil compositions containing excess calcium values in the form of a colloidal dispersion, as, for instance, overbased sulfonate-lubricating oil concentrates prepared by reacting an oil-soluble sulfonic acid with calcium oxide or hydroxide in the presence of a dispersing agent and subsequently carbonating same; or forming a reaction mixture of oil-soluble metal sulfonate and a metal alkoxy ethanolate, adding water to same and effecting hydrolysis, and then stripping of volatiles therefrom. There are numbers of techniques well known in the art of which U.S. Pats. Nos. 3,133,019; 3,155,617; 3,170,880; 3,242,078 and 3,242,080 disclose representative examples. In general, any method may be employed to prepare overbased concentrate feedstocks which consist essentially of colloidally dispersed calcium carbonate compounds and oil-soluble calcium sulfonates in lubricating oil and having a base number of at least 150 and which can be further treated in accordance with the practice of the present invention to prepare highly basic compounds having base numbers in excess of 250. The present invention is particularly advantageously utilized in connection with the further treatment of overbased calcium sulfonate-lubricating oil compositions produced in accordance with the process described and claimed in U.S. Pat. No. 3,428,564, the disclosure of which is incorporated herein by reference.

While various oil-soluble dispersing agents can be used in the overbasing procedure, as shown for instance, in the various foregoing patents, it is especially advantageous to use oil-soluble sulfonic acids or oil-soluble calcium salts thereof, particularly advantageous examples thereof being a calcium salt of sulfonated detergent alkylate bottoms fractions said bottoms fractions, prior to sulfonation, being fractions obtained as by-products from the production of dodecyl benzene and comprising mixtures of monoalkylbenzenes and di- or polyalkyl benzenes, commonly called postdodecyl benzene; and petroleum oil sulfonic acids, especially those which have an average molecular weight in the range of about 400 to about 600. Especially satisfactory are the calcium salts of the petroleum oil sulfonic acids prepared from neutral oil fractions and comprising aromatic high-boiling hydrocarbons having an average molecular weight ranging from about 300 to about 500. Generally, the hydrocarbon portion of the oil-soluble sulfonate may have a molecular weight between about 350 and about 1,000.

The lubricating oil carrier for the aforesaid calcium petroleum sulfonate is most advantageously a non-volatile material in which the sulfonate dispersing agent is soluble. While various non-volatile carriers can be used, many of which are disclosed in the foregoing patents, mineral lubricating oils are the most useful, from a practical commercial standpoint.

The carbonated complex of calcium methoxide as utilized in the process of the present invention is prepared by initially forming a fluid suspension in isobutanol of calcium methoxide. This may be done in a variety of ways as, for instance, by reacting metallic calcium with methanol and then adding isobutanol to the resulting calcium methoxide to form a fluid suspension of the calcium methoxide in the isobutanol, or as disclosed in U.S. Pat. No. 2,451,945 and in Chem. Abstracts, vol. 31, p. 4265 (1958), as well as in British Pat. No. 942,067 where the methanol is reacted with calcium carbide to produce the calcium methoxide and the latter is then admixed with isobutanol to form a fluid suspension.

It is especially advantageous, however, to utilize, in the reaction with the calcium carbide, a mixture of methanol and isobutanol in which the molar ratio of the methanol to isobutanol is in the range of from about 2:1 to about 1:4, and, better still, in the range of from about 1:1 to about 1:2. The aforesaid alcohols are advantageously used in their essentially anhydrous form and the water content thereof is desirably 0.2% or less. The reaction mixture is held at elevated temperature, particularly at reflux temperature, until either the evolution of acetylene, which is formed in the reaction, substantially ceases or the concentration of calcium in the alcohol mixture remains substantially constant. At the conclusion of the reaction, a milky suspension is obtained. The calcium carbide reacts preferentially with the methanol to form calcium methoxide which is insoluble and is suspended in the isobutanol or mixture of methanol and isobutanol. In carrying out the reaction to produce the calcium methoxide, any methanol vapors which are released may be condensed and returned to the reaction vessel. Where calcium carbide is used, the acetylene gas which is evolved in the reaction with the methanol may, if desired, be recovered.

The suspension of the calcium methoxide in the isobutanol may then be distilled, removing a methanol-rich fraction, whereby to reduce the methanol-to-isobutanol ratio of the mixture, and, at times, isobutanol may be added during the distillation, the distillation being carried out until the molar ratio of calcium to methanol approaches but does not become less than 1 mol of calcium to 1.8 mols of methanol. Instead of effecting such distillation at this stage of the process, it is more particularly desirable to carry out the distillation after the carbonation has begun, as described hereinafter.

The calcium concentration in the suspension is variable, but, generally, it is adjusted by additions of isobutanol so that it will usually fall within the range of about 0.3 to about 0.5 mol per 100 grams of isobutanol. In general, the final reaction mixture should contain from 1 to 10% by weight of calcium and especially from about 4 to about 6%, and additional isobutanol should be added to the reaction mixture, if necessary, to maintain the selected calcium concentration.

The suspension so prepared is then carbonated to produce the carbonated complex which is utilized as more fully described herein, in practicing the process of the present invention. While carbon dioxide can be added in its various physical states, it is advantageous from a practical handling and operating standpoint to add it to the reaction mixture as liquid carbon dioxide. The amount thereof is variable but it should be at least sufficient to react with all of the calcium to produce the complex and, in general, the amount added should be such that from about 1.3 to about 2.5 mols of carbon dioxide is reacted per mol of calcium. The carbon dioxide is added under conditions of agitation and at an elevated temperature, above the boiling point of methanol and most desirably in the range of about 150–205° F. It is convenient to use α-naphtholbenzein as an indicator and to carry the carbonation to a point where a color change occurs in said indicator. The carbonated complex which is produced is in the form of a suspension in isobutanol.

In practicing the process of the present invention, an essentially single phase oily admixture is provided by combining an oil-soluble sulfonate dispersing agent lubricating oil concentrate, water and isobutanol, and then the aforesaid carbonated complex is slowly added thereto with agitation. It has been found preferable first to add the water and isobutanol to the sulfonate-lubricating oil solution whose alkalinity is to be increased by practicing the process of the present invention, and then the carbonated complex. This order of addition is not critical, however, and may be altered since all that is essentially required is that the hydrolysis of the carbonated calcium complex take place in the presence of the oil-soluble sulfonate dispersing agent so as effectively to control the colloidal particle size. The carbonated complex is generally added over a period of 30 to 60 minutes thereby allowing hydrolysis to occur. Thereafter the reaction mixture is heated at a temperature of from about 250° F. to 300° F. so as to remove substantially all the water and isobutanol therefrom. The overbased product, after cooling, may then be admixed with water and isobutanol or filtered and the filtrate admixed with water and isobutanol for further treatment with the carbonated complex of calcium methoxide. The final overbased product should be filtered, after removal of volatiles, to form the clear, stable overbased concentrate of the present invention.

The viscosity of the final product is generally appreciably less than about 1000 S.U.S. and, generally in the range of about 200 to 700 and, better yet, in the range of 200 to 400 Saybolt Universal Seconds (S.U.S.) at 210° F. The multi-step process of the present invention unexpectedly not only produces a product having a high base number but such product, speaking particularly of those having a base number in excess of about 350, has been found to have a significantly lower viscosity, as opposed to a one-step procedure wherein the viscosity of the final product, particularly one having a base number in excess of about 350, varies greatly. It is highly advantageous that the products produced by the novel process of the present invention, having base numbers in excess of about 350, have a decidely lower viscosity than products having base numbers in excess of about 350 prepared by only a one-step addition of a carbonated complex to an oil solution of calcium sulfonate, water and isobutanol. This is a surprising and unexpected feature of the process described herein, especially in the light of the fact that, desirably, no further amount of calcium petroleum sulfonate is added during the second overbasing step. This combination of high base number and lower viscosity is highly desirable from a commercial standpoint. Particularly important are overbased lubricating oil compositions having base numbers of at least about 350, especially about 375 to about 450, and S.U.S. viscosities between about 200 and about 700 and, better still, between about 200 and about 400, at 210° F.

The proportions of oil-soluble sulfonate dispersing agent employed in admixture with the lubricating oil are variable, generally desirably being in the range of a about 21% to about 36%, by weight, of the admixture. It has been found, however, that certain minimum proportions of oil-soluble sulfonate dispersing agent must be present in the overbased product, the amount thereof depending on the desired base number. For example, in order to have stably dispersed sufficient calcium compound to produce a 300 base number composition, at least about 15% by weight of oil-soluble sulfonate dispersing agent is required in the finisher overbased composition; a 350 base number concentrate requires at least about 18% by weight of oil-soluble sulfonate; and a 400 base number composition required at least about 22% by weight of oil-soluble sulfonate dispersing agent. A ratio of base number to weight percent oil-soluble sulfonate in the overbased composition up to about 20:1 and preferably between 16:1 and 18:1 is representative of the suitable proportion of oil-soluble sulfonate dispersing agent in the finished product necessary to prepare stable overbased compositions in accordance with the practice of the present invention and indicates the minimum concentration of oil-soluble sulfonate dispersing agent in the lubricating oil composition that is to be upgraded.

The amount of water employed in practicing the process of the present invention is variable within certain limits, but should be at least in excess of that which is stoichiometrically required to hydrolyze the calcium complex salts contained in the carbonated complex of calcium methoxide in isobutanol. Preferably the weight ratio of water to calcium metal present in the carbonated complex will be from about 1.2:1 to 1.8:1, and better yet, about 1.5:1. In the event that the total amount of calcium compound is added over a series of at least two overbasing steps, the amount of water to be used will, under such circumstances, reasonably be apportioned between or among the various overbasing steps of the present invention.

The amount of isobutanol (aside from that which is present in the carbonated complex) which is admixed with the other components of the lubricating oil-dispersing agent admixture may be varied within quite wide limits. However, it has been found that when less than about a 1:1 volume ratio of isobutanol to the total of the other ingredients is used (aside from the carbonate complex), the final product is less clear and is more difficult to filter and the viscosity of the overbased product may be somewhat increased.

The invention is further illustrated by the following examples which are not to be considered limitative of its scope. All percentages stated are by weight unless otherwise indicated, and all temperatures are in degrees F.

EXAMPLE I

Procedure A (1) 144 g. (148 ml.) of a 40% solution of the calcium salts of sulfonated detergent alkylate bottoms having a molecular weight in the range of 440–460 in a mineral lubricating oil, said solution having a base number of about 18, was admixed with 160 g. (200 ml.) of isobutanol and 32 ml. water. To said mixture there was added, under conditions of agitation and over a period of about 30 minutes, 448 g. of a carbonated complex of calcium methoxide in isobutanol, prepared as hereinbefore disclosed, which contained 22.4 g. of calcium. The mixture was then heated to 300° to remove solvents and water and, when the temperature reached 300°, nitrogen gas was blown through the mixture to remove all traces of volatiles. The residue was then filtered and cooled. The product was found to have a base number of about 300 and viscosity about 250 S.U.S. at 210°.

(2) To 144 g. of the overbased product from part (1) there was added 160 g. (200 ml.) of isobutanol and 17 ml. of water. Sufficient carbonated complex (164 g.) to furnish 8.2 g. of calcium was then added over a 30 minute period with agitation. Volatiles were again removed as described above, and, upon filtering, a stable, clear product having a base number of 399 and a viscosity of 210 S.U.S. at 210° was produced.

Procedure B (1) 144 g. (148 ml.) of a 40% solution of calcium salts of sulfonated detergent alkylate bottoms having a molecular weight in the range of 440–460 and mineral lubricating oil, as described in part (1) of Procedure A, was admixed with 160 g. (200 ml.) of isobutanol and 32 ml. of water. Then, 448 g. of the carbonated complex, as described in part (1) of Procedure A which contained 22.4 g. of calcium, was added to the admixture with agitation over a period of 30 minutes. The mixture was then heated to remove alcohol and water. When the temperature reached about 245°, heating was discontinued and the batch was cooled to about 80°.

(2) 160 g. (200 ml.) of isobutyl alcohol and 17 ml. of water were then added to the batch with agitation. Agitation was continued while 247 g. of the carbonated complex containing 13.3 g. of calcium was added over a 30 minute period. The mixture was then heated to about 300° to remove alcohol and water and, when the temperature of 300° was reached, nitrogen was was blown through the mixture to remove all traces of volatiles. The residue was then filtered and cooled. The stable, clear product was found to have a base number of 413 and viscosity of 284 S.U.S. at 210°.

EXAMPLE II

For comparison purposes, stable overbased products with base numbers in excess of 350 were prepared by using only a one-step overbasing procedure. The procedure used in this example was the same as that described in part (1) of Procedure A of Example I except that the amount of water and carbonated complex used was as indicated in Table I below:

TABLE I

| Test | Water (ml.) | Carbonated total (g.) | Complex calcium (g.) | Base number | Viscosity (S.U.S. at 210) |
|---|---|---|---|---|---|
| 1 | 40 | 597 | 29.9 | 391 | 2,747 |
| 2 | 43 | 648 | 32.4 | 368 | 1,459 |
| 3 | 44 | 668 | 33.4 | 376 | 2,643 |
| 4 | 45 | 687 | 34.4 | 379 | 986 |

As can readily be seen, the multi-step procedures of Example I produce products with high base numbers and decidedly lower viscosity than by adding the same quantity of calcium in a carbonated complex in a one-step procedure. The overbased compositions manufactured by the multi-step process of the present invention also generally exhibit more uniform properties. The very low viscosity of the materials so produced indicates a more concentrated colloid with a smaller particle size.

EXAMPLE III

This example illustrates the use of various amounts and types of oil-soluble sulfonate dispersing agents in the preparation of highly overbased compositions. In the experiments tabulated below in Table II, all products were prepared according to Procedure B of Example I, except that the type and proportions of various ingredients are as noted below and the total water and calcium complex use was added in equal proportions to each step of the process.

TABLE II

| Test | Sulfonate conc. (percent) | Carbonated complex | | Product | | | | |
|---|---|---|---|---|---|---|---|---|
| | | Total (g.) | Calcium (g.) | Base No. | Visc. SSU | Sulf. (percent) | Ratio BN/sulf. | Appearance |
| 1 | 35 | 448 | 22.4 | 293 | 163 | 25.3 | 11.6 | Stable. |
| 2 | 35 | 448 | 22.4 | 291 | 82 | 25.3 | 11.5 | Do. |
| 3 | 30 | 448 | 22.4 | 294 | 150 | 21.6 | 13.5 | Do. |
| 4 | 30 | 448 | 22.4 | 278 | 66 | 21.6 | 13.0 | Do. |
| 5 | 26 | 448 | 22.4 | 294 | 114 | 18.7 | 15.7 | Do. |
| 6 | 20 | 448 | 22.4 | 278 | 88 | 14.4 | 19.3 | Do. |
| 7 | 20 | 575 | 28.7 | 346 | 132 | 13.4 | 25.6 | Gel. |
| 8 | 30 | 696 | 34.8 | 350 | 156 | 18.7 | 18.7 | Stable. |
| 9 | 30 | 834 | 41.7 | 366 | 430 | 17.5 | 20.9 | Gel. |
| 10 | 32 | 696 | 34.8 | 385 | 175 | 20.0 | 19.2 | Stable. |
| 11 | 32 | 834 | 41.7 | 402 | 378 | 18.6 | 21.6 | Gel. |
| 12 | 36 | 699 | 34.9 | 400 | 299 | 22.5 | 17.8 | Stable. |

Tests Nos. 1, 3, 5, 6 and 7 employed as the oil-soluble dispersing agent the calcium salt of a petroleum sulfonic acid having a molecular weight in the range of 450 to 550; tests Nos. 2 and 4 employed the calcium sulfonate of Example I; and tests Nos. 8, 9, 10, 11, and 12 employed a 50–50 weight mixture of the petroleum and synthetic sulfonates described above.

The gels noted above in tests Nos. 7, 9 and 11 formed a few days after the overbased products had been made. It will be thus be seen, from the above tests, that when the ratio of base number to sulfonate dispersant exceeded a ratio of about 20:1, gelation occurred.

EXAMPLE IV

Plant scale productions of approximately 400 base number high alkalinity sulfonates were carried out. A product prepared according to part (1), Procedure A, of Example I having a base number of 292 and viscosity of about 400 S.U.S. at 210° was overbased further, the objective being to prepare an approximately 400 base number product.

In run No. 1, 450 gallons of the overbased product having a base number of 292 were admixed with 830 gallons of isobutanol and 42 gallons of water. To this admixture was added 880 gallons of a carbonated complex of calcium methoxide in isobutanol which contained 4.5% by weight of calcium. After addition of the complex was complete, the reactants were stirred for 30 minutes and the volatiles were stripped off by increasing the temperature up to about 300°, blowing the mixture with nitrogen gas, and then filtering. The finished product was clear and stable and had a base number of 383 and a viscosity of 407 S.U.S. at 210°.

Run No. 2 was a repeat of Run No. 1 except that 991 gallons of carbonated complex were used. Again, after removal of volatiles followed by filtration, a clear, stable product having a base number of 398 and a viscosity of 567 S.U.S. at 210° was obtained. The product contained 23.3% sulfonate dispersing agent.

EXAMPLE V

Employing Procedure B of Example I except that 34 ml. of water and 553 g. of carbonated complex containing 33.6 g. of calcium were added during part (2) of said procedure, a stable clear product having a base number of 456 and a viscosity of 463 S.U.S. at 210° was produced.

What is claimed is:
1. A process for the preparation of a stable colloidal dispersion having a viscosity of less than about 1000 S.U.S. at 210° F. of a calcium compound in a lubricating oil composition which comprises:
   (a) providing a carbonated complex of calcium methoxide in isobutanol,
   (b) under conditions of agitation, adding said caran oil-soluble dispersing agent in the form of a calcium sulfonate, the amount of calcium sulfonate being sufficient to produce in the final overbased product a ratio of base number to weight percent of oil-soluble sulfonate of up to about 20:1, isobutanol and water, the amount of water is at least in excess of bonated complex to a mixture of a lubricating oil, that which is stoichiometrically required to hydrolyze said complex,
   (c) allowing hydrolysis to take place whereby to effect cololidal dispersion of the hydrolyzed calcium salts,
   (d) heating said dispersion to effect stripping of volatiles therefrom,
   (e) allowing said dispersion to cool and adding thereto effective amounts of isobutanol and water,
   (f) under conditions of agitation, adding an effective amount of the aforesaid carbonated complex (a) to said dispersion,
   (g) allowing hydrolysis to take place whereby to effect colloidal dispersion of the hydrolyzed calcium salts,
   (h) heating said dispersion to effect stripping of volatiles therefrom, and
   (i) then filtering whereby to produce a clear filtrate having a base number not less than about 250.

2. A process for the preparation of a stable colloidal dispersion having a viscosity of less than about 1000 S.U.S. at 210° F. of a calcium compound in a lubricating oil composition which comprises:
   (a) providing a carbonated complex prepared by carbonating a fluid suspension of calcium methoxide in isobutanol, said suspension, prior to carbonation, containing from about 1 to about 10% by weight of calcium, said complex being characterized by substantial insolubility in methanol or isobutanol or mixutres thereof, or in mineral oil,
   (b) under conditions of agitation, adding said carbonated complex to an essentially single phase oily solution containing a lubricating oil, an oil-soluble dispersing agent in the form of a sulfonic acid, or calcium salt thereof having a pH not less than 7, the amount of said dispersing agent being sufficient to produce in the final overbased product a ratio of base number of weight percent of oil-soluble sulfonate of up to about 20:1, isobutanol and water, the amount of water is at least in excess of that which is stoichiometrically required to hydrolyze said complex, while maintaining essentially said single phase during said addition,
   (c) allowing hydrolysis to take place under conditions of agitation whereby to effect colloidal dispersion of the hydrolyzed calcium salts, said mixture being converted to a creamy suspension,
   (d) heating said creamy suspension to effect stripping of volatiles therefrom,
   (e) allowing said dispersion to cool and adding thereto effective amounts of isobutanol and water while maintaining as an essentially single phase dispersion, (f) under conditions of agitation, adding an effective amount of the aforesaid carbonated complex (a) to said single phase dispersion of step (e) while maintaining essentially said single phase during said addition, (g) allowing hydrolysis to take place under conditions of agitation whereby to effect colloidal dispersion of the hydrolyzed calcium salts, (h) heating said dispersion to effect stripping of volatiles therefrom, and (i) then filtering whereby to produce a clear filtrate having a base number not less than about 250.

3. The process of claim 2, wherein the oil-soluble calcium sulfonate is derived from the group of petroleum oil sulfonic acids, alkyl aryl sulfonic acids, and mixtures thereof.

4. The process of claim 3, wherein the sulfonic acids are those of postdodecyl benzene.

5. An overbased lubricating oil composition comprising a major proportion of a petroleum hydrocarbon lubricating oil, and a minor detergent amount of the overbased product produced by the process of claim 1.

6. The overbased lubricating oil composition of claim 5 in which the overbased product has a base number of at least 350 and an S.U.S. viscosity at 210° F. of between 200 and about 700.

7. The overbased lubricating oil composition of claim 5 in which the sulfonic acid is postdodecylbenzene sulfonic acid.

References Cited
UNITED STATES PATENTS

| | | | |
|---|---|---|---|
| 3,242,079 | 3/1966 | McMillen | 252—18 |
| 3,428,564 | 2/1969 | Bluestein et al. | 252—33 |

DANIEL E. WYMAN, Primary Examiner

I. VAUGHN, Assistant Examiner

U.S. Cl. X.R.

252—33